US012213925B2

(12) United States Patent
Drake et al.

(10) Patent No.: US 12,213,925 B2
(45) Date of Patent: Feb. 4, 2025

(54) PRIVACY SCREEN

(71) Applicant: Drake Solutions, LLC, Estero, FL (US)

(72) Inventors: Jessie Drake, Estero, FL (US); Ajay Singhal, New York City, NY (US)

(73) Assignee: Drake Solutions, LLC, Estero, FL (US)

( * ) Notice: Subject to any disclaimer, the term of this patent is extended or adjusted under 35 U.S.C. 154(b) by 280 days.

(21) Appl. No.: 17/583,191

(22) Filed: Jan. 24, 2022

(65) Prior Publication Data

US 2022/0142839 A1 May 12, 2022

Related U.S. Application Data

(63) Continuation-in-part of application No. PCT/US2020/043157, filed on Jul. 22, 2020.

(60) Provisional application No. 62/877,304, filed on Jul. 22, 2019.

(51) Int. Cl.
*A61G 1/04* (2006.01)
*A61G 7/05* (2006.01)
*F16B 2/18* (2006.01)
*F16B 2/20* (2006.01)
*F16B 2/12* (2006.01)

(52) U.S. Cl.
CPC .............. *A61G 7/0526* (2013.01); *A61G 1/04* (2013.01); *A61G 7/05* (2013.01); *F16B 2/12* (2013.01); *F16B 2/20* (2013.01)

(58) Field of Classification Search
CPC .......... A61G 7/0526; A61G 1/04; A61G 7/05; F16B 2/12; F16B 2/02; F16B 2/18; F16B 2/246; F16B 2/20; F16M 13/022
See application file for complete search history.

(56) References Cited

U.S. PATENT DOCUMENTS

| 2,693,744 | A | * | 11/1954 | Smith | G03B 13/20 356/17 |
|---|---|---|---|---|---|
| 4,017,917 | A | * | 4/1977 | Brown | A61F 5/3769 5/617 |
| 4,305,168 | A | * | 12/1981 | Holter | A61G 7/05 5/904 |
| 6,241,653 | B1 | * | 6/2001 | Gauger | A61G 10/005 600/21 |
| 6,487,735 | B1 | * | 12/2002 | Jacques, II | A61G 10/005 5/512 |
| 7,150,052 | B1 | * | 12/2006 | Lawson | A47D 9/00 5/97 |
| 8,464,379 | B1 | * | 6/2013 | Zajac | A61G 1/04 5/113 |
| 9,644,390 | B1 | * | 5/2017 | Garvens | A47C 21/00 |
| 11,406,550 | B1 | * | 8/2022 | Barrett | A61G 10/005 |
| 2003/0115671 | A1 | * | 6/2003 | Smeed | A61G 1/04 5/503.1 |
| 2004/0128760 | A1 | * | 7/2004 | Schatz | A61G 7/0509 5/288 |

(Continued)

*Primary Examiner* — Phi D A
(74) *Attorney, Agent, or Firm* — Diana Mederos; Mederos Legal, PLLC (57) ABSTRACT

A privacy screen with rapid deploy, mount, and storage features. The privacy screen comprises a semi-rigid frame supporting a cover. The privacy screen is held in place with tension or friction against bed side rails. The privacy screen is portable, provides privacy to a patient, and allows patient access by a health care professional.

16 Claims, 6 Drawing Sheets

(56) References Cited

U.S. PATENT DOCUMENTS

| | | | | |
|---|---|---|---|---|
| 2005/0241648 | A1* | 11/2005 | Dobbs | A61G 1/04 |
| | | | | 128/857 |
| 2006/0101578 | A1* | 5/2006 | Shalikar | A61G 7/0507 |
| | | | | 5/426 |
| 2009/0151137 | A1* | 6/2009 | Darling, III | B62D 63/061 |
| | | | | 24/568 |
| 2012/0284916 | A1* | 11/2012 | Hill | A61G 5/10 |
| | | | | 160/239 |
| 2014/0090680 | A1* | 4/2014 | Reis | A61G 1/017 |
| | | | | 135/96 |
| 2014/0117702 | A1* | 5/2014 | Rossi | B60J 7/102 |
| | | | | 296/100.14 |
| 2016/0115704 | A1* | 4/2016 | Burke | A61G 5/10 |
| | | | | 135/126 |
| 2018/0195308 | A1* | 7/2018 | Olivo | E04H 15/20 |
| 2020/0179193 | A1* | 6/2020 | Guillermo | A47C 29/003 |
| 2021/0106145 | A1* | 4/2021 | Christmas | A61G 10/005 |
| 2021/0298973 | A1* | 9/2021 | Barbosa | A61G 7/0526 |
| 2021/0307535 | A1* | 10/2021 | Skelton | A47C 29/003 |
| 2022/0225785 | A1* | 7/2022 | Morris | A47C 29/003 |
| 2022/0265493 | A1* | 8/2022 | Baker | A61G 1/04 |

* cited by examiner

Step 1

Step 2

Step 3

Step 4

PRIVACY SCREEN

CROSS-REFERENCE TO RELATED APPLICATION

This application is a bypass continuation-in-part application which claims priority to pending application number PCT/US2020/043157 having an international filing date of Jul. 22, 2020, which claims the benefit of U.S. provisional application No. 62/877,304, filed Jul. 22, 2019, entitled Privacy Screen, the contents of which are hereby incorporated by reference.

FIELD OF THE DISCLOSURE

The present disclosure relates to methods and apparatuses for a privacy screen. More specifically, the present disclosure presents a portable, quick-deploy privacy screen for use in health care settings.

BACKGROUND OF THE DISCLOSURE

Privacy is a main concern for many patients in hospitals, outpatient centers, hospice, and during emergency transit such as from an ambulance into an emergency room. Therefore, there is a need to maintain patient privacy while stationary and during transportation.

Patients are often transported from room to room on a wheeled hospital bed. During transport, the patient's face is exposed. Therefore, anyone can identify the patient. Furthermore, patients who may have a light sensitivity, especially after surgery, must close their eyes or block the light with their hands, the sheets, or other object such as a magazine.

Covering the patient's head with a sheet, towel, or other object blocks the health care practitioner's access to the patient. For example, some patients may need close monitoring, due to intubation, or needing to be placed on a ventilator. Health care practitioners also need to continue to monitor vital signs. During patient transport, health care practitioners may need to administer critical care such as resuscitation methods. Accordingly, it is important to respect the patient's privacy while also being able to access the patient to provide the appropriate care.

Some privacy screens currently available are large, bulky, and cannot be used during patient transport. For example, some hospitals may have large rooms with multiple patients, especially during a pandemic when health care facilities are overwhelmed. The patients are separated by either a curtain in the room or by a tri fold or quad-fold type of screen that is mounted to the hospital bed. Sometimes, there is not enough room for enough curtains for each patient. Such traditional screens are not portable, require tools to assemble, and do not block bright light from overhead.

SUMMARY OF THE DISCLOSURE

What is needed is are the methods and apparatuses for privacy screens that are portable, easy to use, comfortable for patients and health care providers, and that are easily assembled and fixed in place. The privacy screen comprises a cover and a semi-rigid frame. The privacy screen cover has an exterior convex surface and an interior concave surface. The privacy screen cover is stretched by the attached frame. The frame creates a polygonal shape for the cover with side portions. One side portion placed against the hospital bed side rail. Pressure is applied to cause a convex bend at an apex of the frame with cover. The apex is brought over the center of the hospital bed, and the second side portion is placed against the opposite hospital bed side rail. The tension of the frame pushed against the hospital bed side rails maintains the frame and cover in place with a substantially convex outward shape.

In one embodiment, the privacy screen is folded and stored in a pouch. The privacy screen is removed from the pouch and unfolded or popped open. After use, the privacy screen is discarded or cleaned or folded or returned to the pouch.

In one embodiment, the privacy screen cover is transparent, translucent, or opaque.

In one embodiment, the privacy screen cover is treated with an additive such as fragrance, antimicrobial, or anti-static substance.

In one embodiment, the grip portion of the privacy screen is coupled to the grip portion adaptor assembly.

BRIEF DESCRIPTION OF THE DRAWINGS

The accompanying drawings that are incorporated in and constitute a part of this specification illustrate several embodiments of the disclosure and, together with the description, serve to explain the principles of the disclosure.

NUMERALS OF THE FIGURES

1. Screen
3. Cover
6. Exterior convex surface
9. Interior concave surface
12. Frame
15. Polygonal shape,
18. First side portion
19. Second side portion
21. Bend
24. Apex
27. Grip portion
30. Patient
33. Health care practitioner
36. Proximal end
39 Distal end
42. Bed
45. Hospital bed center
48. First hospital bed side rail
51. Second hospital bed side rail
52. Pouch
53. Additive
55. Grip portion adaptor assembly
57. Clamp
59. Lever
61. Bracket body 63. Adjustment slider knob
65. Clamp receiver
67. Clamp rest
69. Clamp donor member
71. Screen receiver bracket
73. Adjustment opening
75. Clamp grip portion

DETAILED DESCRIPTION

The present disclosure provides generally for methods and apparatuses for a privacy screen for use in hospital and health care settings. The privacy screen is quickly deployed, lightweight, and allows patient access, so health care practitioners may continue to administer care and maintain eye contact with the patient during transport within OT to a health care facility. The privacy screen comprises a frame and a cover that may be removably or fixedly attached to each other. The privacy screen is removably attached to a hospital bed and held in place by tension. Grip portions prevent the removal of the privacy screen due to wind resistance during transport. The privacy screen cover may be treated with an additive.

In the following sections, detailed descriptions of examples and methods of the disclosure will be given. The description of both preferred and alternative examples are exemplary only, and it is understood that to those skilled in the art that variations, modifications, and alterations may be apparent. It is therefore to be understood that the examples do not limit the broadness of the aspects of the underlying disclosure as defined by the claims.

Figures 1A, 1B:
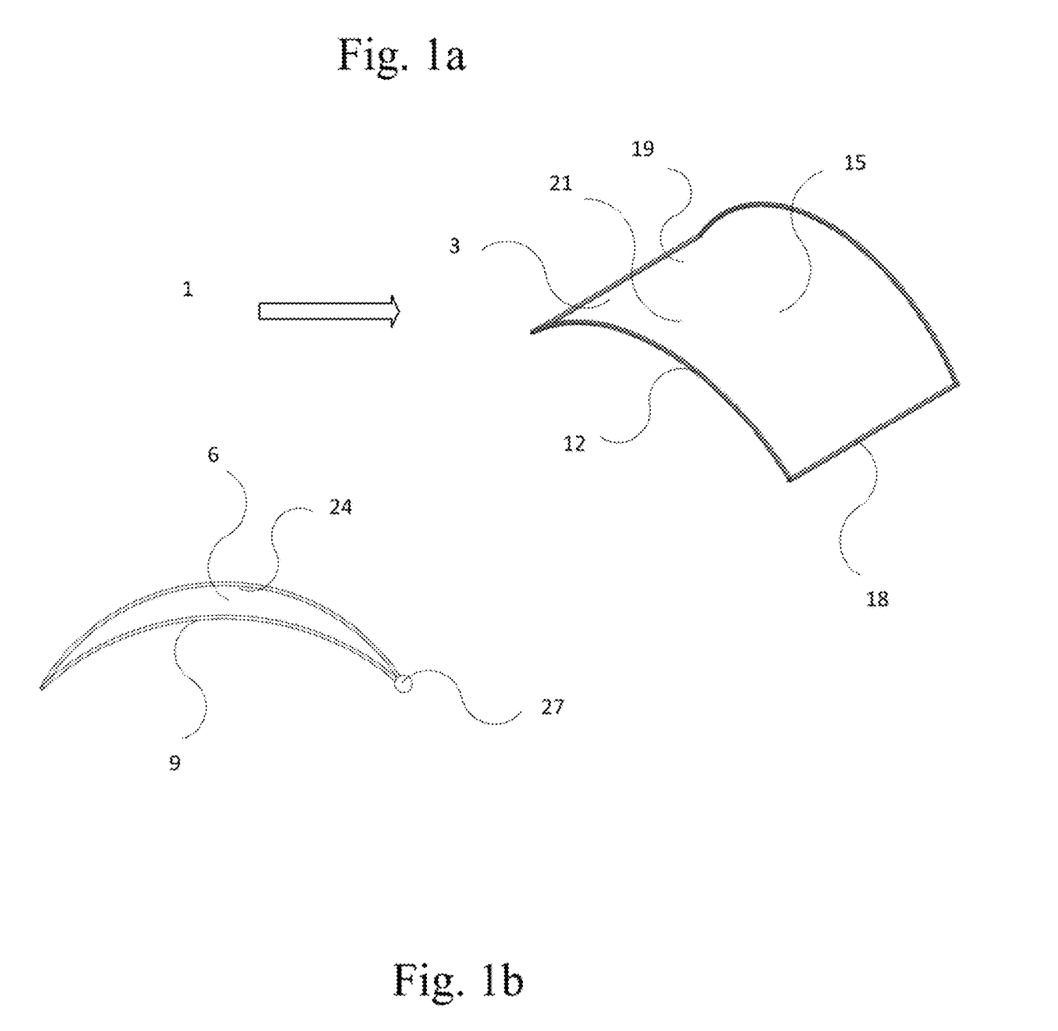
FIGS. 1a and 1b show a perspective view and a frontal view of an exemplary privacy screen.

Referring now to FIG. 1, various views of an exemplary privacy screen are shown. Generally, the privacy screen has a flat polygonal shape. The flat shape is bent to an arched shape having a convex outer surface and a concave inner surface. The apex is at the center of the privacy screen and aligned over the center of a hospital bed mattress. In preferred embodiments, the flat privacy screen has a width greater than the width of the hospital bed. All exemplary dimension is about 38 inches wide and about 25 inches long with vertical clearances when bent from about 7 inches to about 12 inches. However, other suitable measurements are contemplated for being used in conjunction with a hospital bed having bedside rails.

The privacy screen comprises a cover and a semi-rigid frame. The cover may be a fabric made of synthetic or natural materials or a combination thereof. The fabric or cover may be translucent, transparent, or opaque. The fabric or cover may be treated with an additive such as antimicrobial composition. The fabric or cover may be treated with an additive such as aromatherapy or fragrance compositions. The fabric or cover may contain an additive such as an anti-static composition. The fabric may be re-usable or disposable.

The semi-rigid frame may be made out of a polymer or a metal or combinations thereof. The frame may be a closed polygonal structure or may be opened on at least one side to attach a cover. The cover may have a seam through which the frame may be threaded. The cover may have fasteners to attach the cover to the frame. Exemplary fasteners include hook-and-loop closures, buttons, zippers, adhesives, or elastics. The cover may cover the frame entirely or partially. In some embodiments, the frame boning may be sewn into the cover material to comprise a single piece.

In some embodiments, the frame or the cover may have grips that may be fixedly or removably attached. For example, silicone, rubber, or polymer padding, covering, edging, or bumpers may be present at the sides of the privacy screen that are placed against the hospital bed side rails. The grips prevent the privacy screen from accidently slipping out of place due to wind resistance or bumps during transport. The grips may improve friction between the cover sides and frame and a bed side rail. The grips may be placed on the frame itself or attached to the fabric cover portion.

Figures 2A, 2B, 2C:
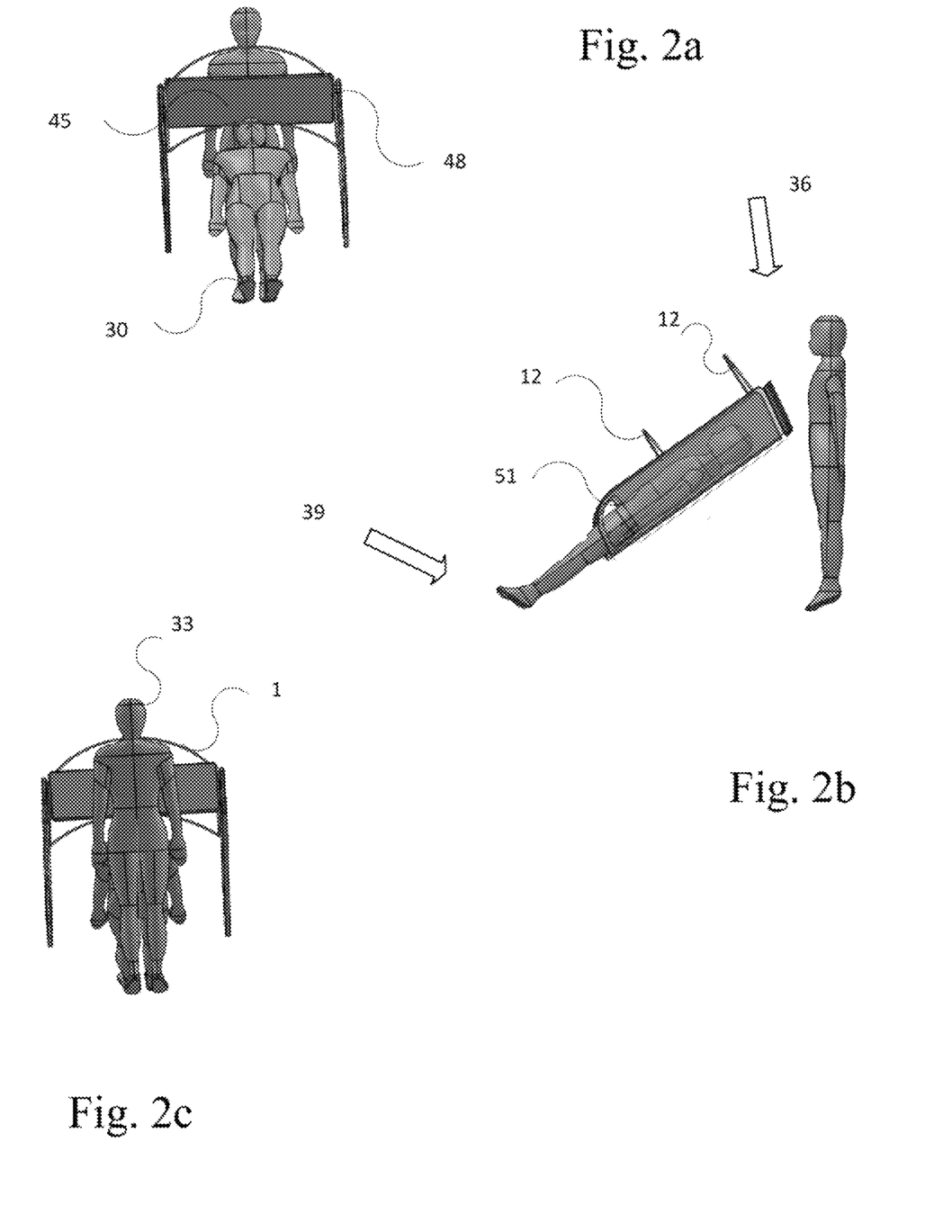
FIGS. 2a, 2b, and 2c show placement of an exemplary privacy screen on a hospital bed with a patient and health care practitioner access in a frontal view, a side view, and a rear view, respectively.

Referring now to FIG. 2, the placement of an exemplary privacy screen on a hospital bed and health care practitioner access is shown. The hospital bed has bed side rails on either side of the bed. The patient is positioned with the head at the top and the feet toward the bottom of the bed. The privacy screen is placed so that each end rests against or pushes against each side rail. The privacy screen frame side portions are positioned between the mattress and the side rail. The privacy screen is positioned toward the top of the bed over the patient's head. In some embodiments, the privacy screen may cover more than the patient's head. For example, a privacy screen may cover the upper half of the body or even the full length of the body. This provides greater privacy.

Toward the top of the mattress or at the proximal end and opposite the distal end, the privacy screen has a proximal opening. Toward the bottom of the mattress, the privacy screen has a distal opening. The health care practitioner can access the patient's head from either the proximal or the distal opening. The health care practitioner can continue to communicate and make eye contact with the patient.

The tension or friction holding the screen in place creates a convex outer shape and a convex inner shape from the patient's point of view. This allows room for administering critical care treatment and monitoring vital signs during patient transport as well as while the patient is stationary. The privacy screen also provides some relief from overhead lights, especially when the patient is in recovery from surgery.

Figure 3:
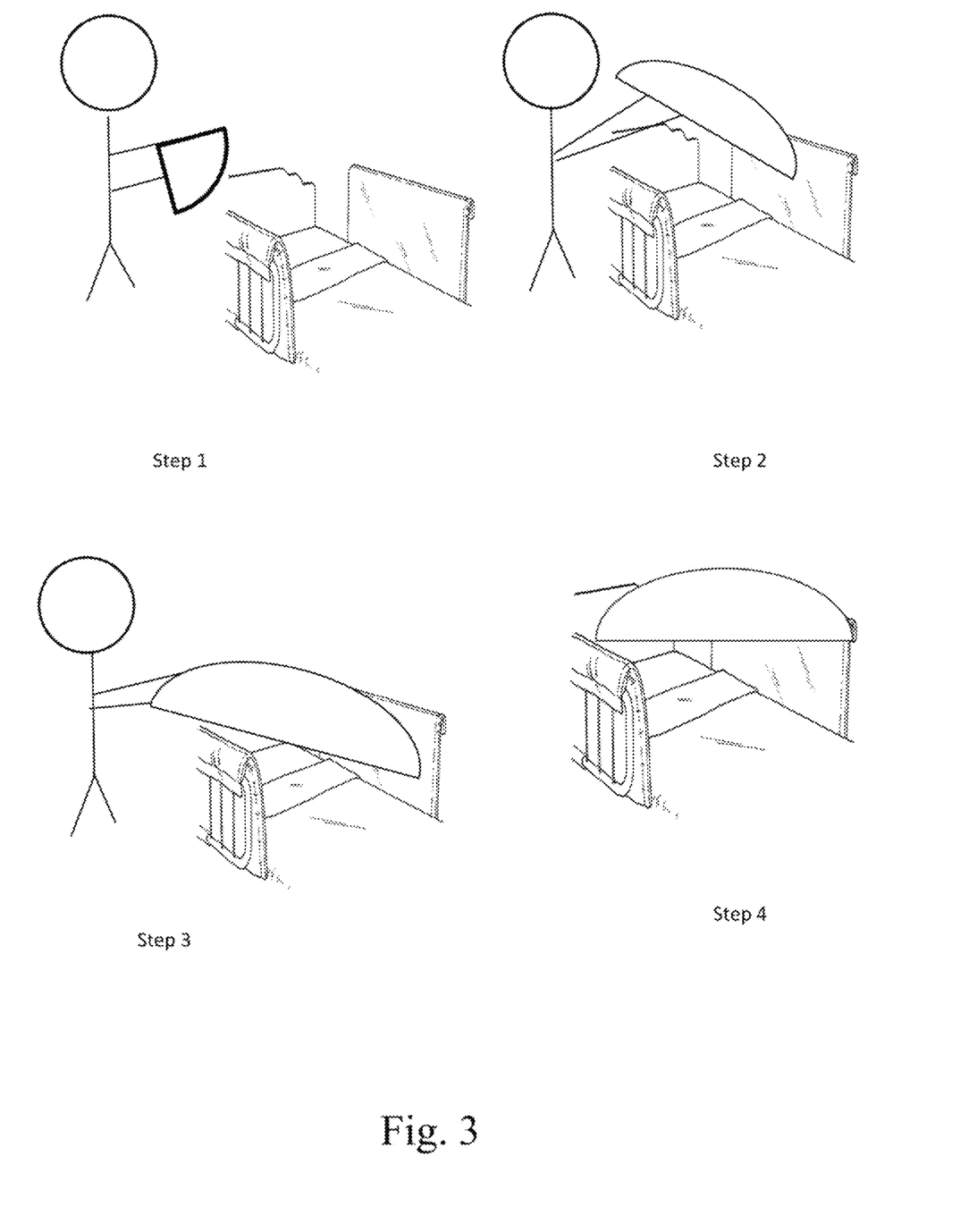
FIG. 3 shows the exemplary method steps for implementing a privacy screen of the disclosure.

Referring now to FIG. 3, the exemplary method steps for implementing a privacy screen are shown. In exemplary applications, the basic steps include the following: obtaining the privacy screen in step 1, placing a first side of the privacy screen against a first side of a hospital bed side rail as in step 2, bending the frame and cover over the center of the hospital bed to create an apex about the center as in step 3, and fitting the second side of the privacy screen against the second side bed rail as in step 4. Tension or friction will hold the privacy screen in place. In additional method steps, a health care practitioner may apply an additive to the cover. The additive may calm the patient, especially if an aromatherapeutic composition such as lavender is used. However, in some embodiments, the cover may already be impregnated with an additive in the fabric.

Figure 4:
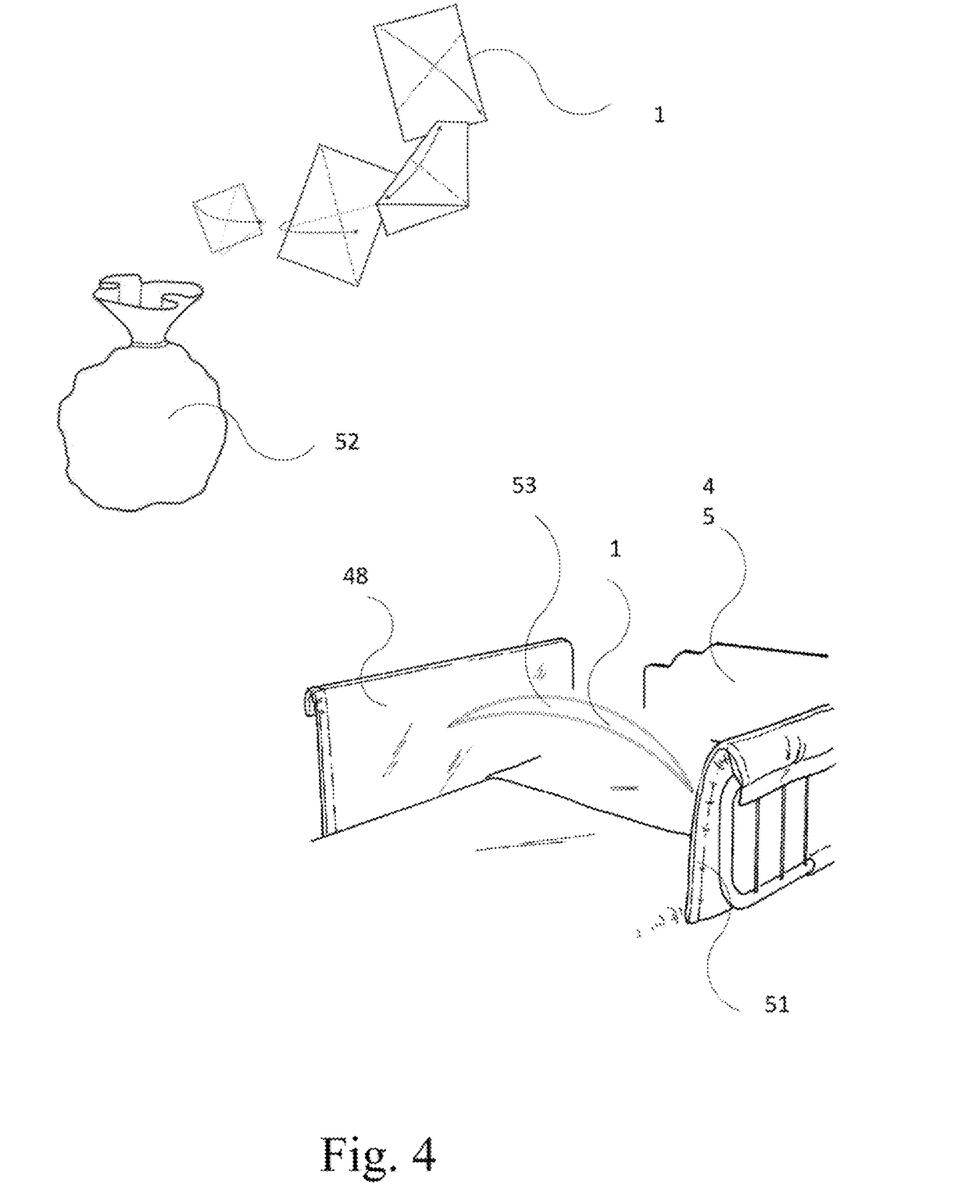
FIG. 4 shows a privacy screen being opened from a pouch and placed against hospital bed rails.

Referring now to FIG. 4, a privacy screen being opened from a pouch and placed against hospital bed rails. In some method steps, the privacy screen will be folded and stored in pouch or container. The privacy screen may be already attached to the hospital bed for immediate access or may be stored in a separate location such as a supply room or nurses' station. The privacy screen is accessed from the pouch or container and unfolded. The privacy screen may be folded and unfolded by twisting, layering, covering, or opening about a horizontal or a vertical axis.

Once the privacy screen is no longer needed, the screen may be disposed of completely. The privacy screen cover may be removed and disposed of or washed and reused. The privacy screen may be reused if contamination is not a concern.

The health care practitioner may access the patient at the front end of the bed at the proximal opening of the privacy screen or at the center of the bed at the distal opening of the privacy screen. The privacy screen may be removed immediately by a health care practitioner or by a patient if desired.

Figure 5:
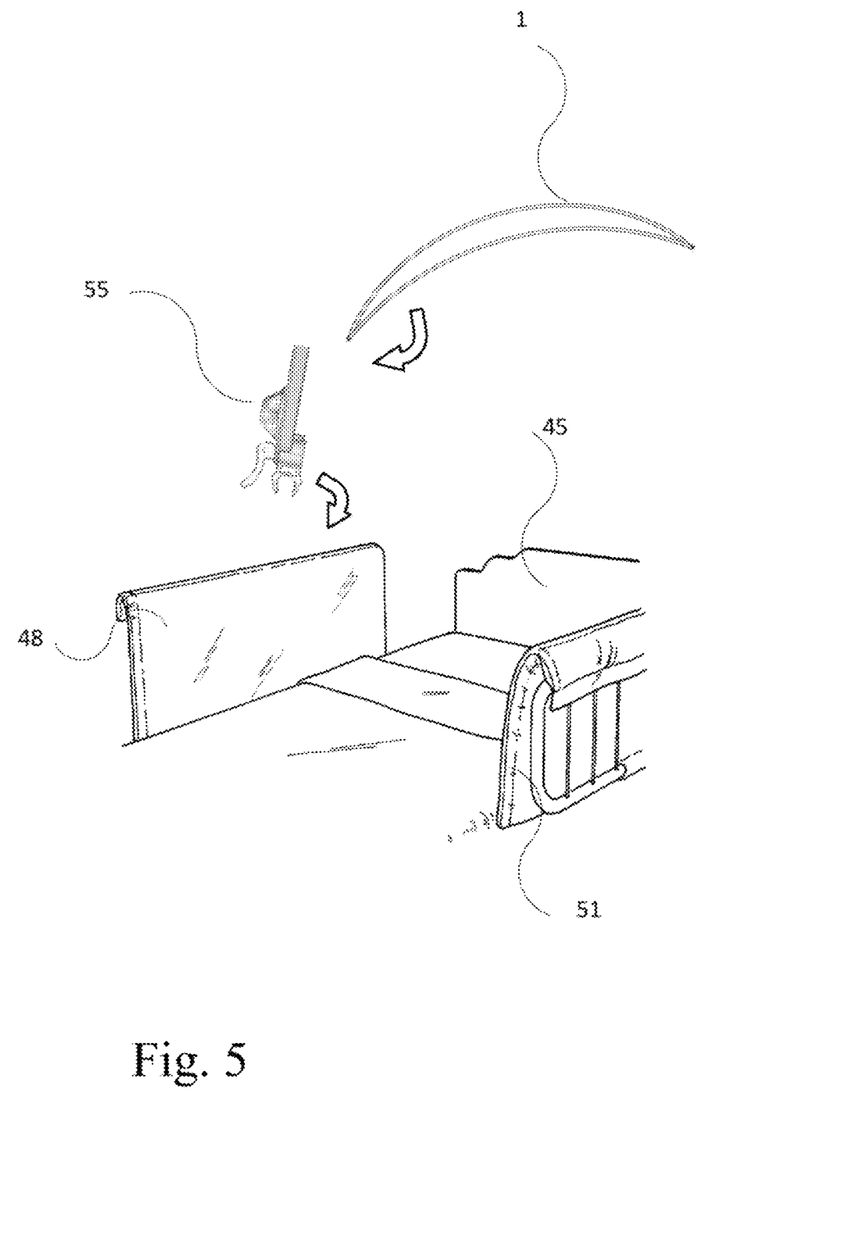
FIG. 5 shows a privacy screen coupled with a grip portion adaptor assembly.

Referring now to FIG. 5, an exemplary privacy screen coupled with a grip portion adaptor assembly is shown. In some embodiments, an adaptor is attached to the privacy screen at the grip portion. The adaptor is secured to a hospital bed railing.

Figure 6:
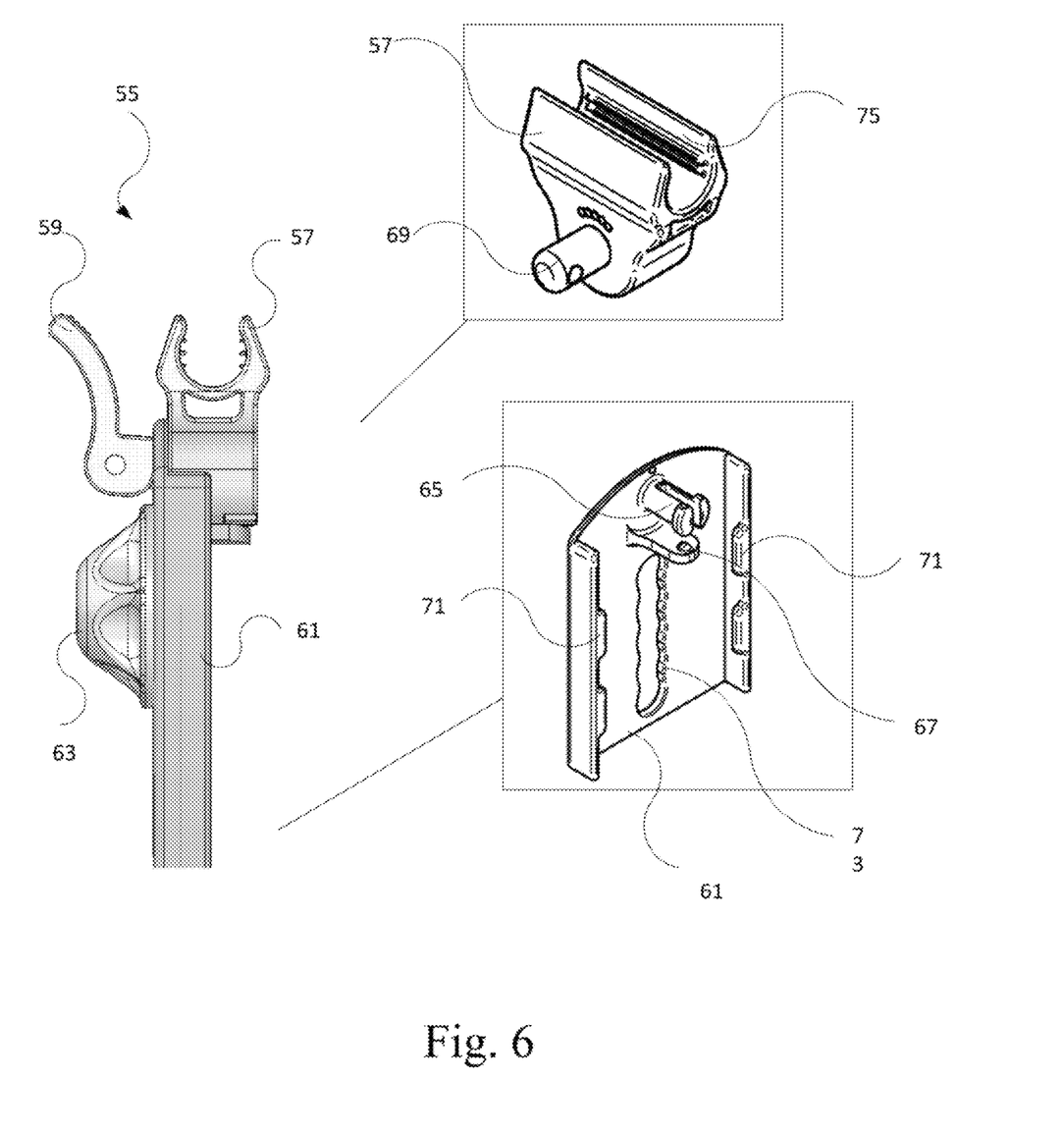
FIG. 6 shows an exploded view of an exemplary grip portion adaptor assembly.

Referring now to FIG. 6, an exploded view of an exemplary grip portion adaptor assembly is shown. An adaptor assembly may comprise a clamp, a lever, a bracket body, an adjustment slider knob, a clamp receiver, a clamp rest, a damp donor member, a screen receiver bracket, an adjustment opening, and a clamp grip portion. The clamp donor member is inserted to frictionally fit into the clamp receiver. The lever is depressed to compress the clamp receiver, securing the clamp donor member. The lever is raised to release the clamp receiver for removal of a clamp donor member. The clamp and the bracket body are interchangeable.

In some embodiments, the adaptor clamp may connect to a hospital bed rail, and the privacy screen may be secured with the screen receiver brackets and secured with the adjustment slider knob. In an alternative embodiment, the privacy screen is received by the clamp grip portion, and the adaptor is secured to a hospital bed rail at the bracket body and secured with the adjustment slider knob.

CONCLUSION

A number of embodiments of the present disclosure have been described. While this specification contains many specific implementation details, these should not be construed as limitations on the scope of any disclosures or of what may be claimed. The exemplary embodiments in the detailed description and the figures serve as descriptions of features specific to particular embodiments of the present disclosure.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations or method steps are depicted in the drawings in a particular order, this should not be understood as requiring that such operations be performed in the particular order shown or in sequential order, or that all illustrated operations be performed, to achieve desirable results.

Thus, particular embodiments of the subject matter have been described. Other embodiments are within the scope of the following claims. Nevertheless, it will be understood that various modifications may be made without departing, from the spirit and scope of the claimed disclosure.

What is claimed is:

1. A privacy screen, the screen comprising:
a semi-rigid frame in a polygonal shape having a first side portion and a second side portion;
a cover connected to the semi-rigid frame;
a grip portion adaptor assembly comprising a bracket body, an adjustment slider knob, a lever, and a clamp;
wherein the bracket body has two parallel screen receiver brackets, a clamp receiver positioned at the top center of the bracket body, a clamp rest located below the clamp receiver, and a longitudinal adjustment opening that interfaces with the adjustment slider;
wherein the clamp has a clamp grip portion that interfaces with a hospital bed side rail and has a clamp donor member that is inserted to frictionally fit into the clamp receiver of the bracket body;
wherein the screen is bent at an apex to have a convex outer surface and a concave inner surface;
wherein the cover connected to the semi-rigid frame is secured to the screen receiver bracket by the adjustment slider knob to the bracket body of the grip portion adaptor assembly.

2. The privacy screen of claim 1 further comprising at least one grip portion at at least one side portion.

3. The privacy screen of claim 1 wherein the cover is removable.

4. The privacy screen of claim 1 wherein the cover is treated with an additive.

5. The privacy screen of claim 4 wherein the additive is an antimicrobial composition.

6. The privacy screen of claim 4 wherein the additive is an anti-static composition.

7. The privacy screen of claim 4 wherein the additive is an aroma therapeutic composition.

8. The privacy screen of claim 1 wherein the screen is folded about a horizontal axis, vertical axis, or both and is stored in a pouch.

9. The privacy screen of claim 8 wherein the pouch is attached to a hospital bed for quick access.

10. The privacy screen of claim 1 wherein the screen is disposable.

11. The privacy screen of claim 1 wherein at least one side portion is fixedly attached to a bed side rail.

12. A method of using the privacy screen of claim 1, the method steps comprising:
Locating a privacy screen;
Placing a first side portion against a first hospital bed side rail; and
Placing a second side portion against a second hospital bed side rail.

13. The method of claim 12 further comprising inducing a bend at the apex to create an exterior convex surface and an interior concave surface.

14. The method steps of claim 12 further comprising aligning the apex with a center of a hospital bed.

15. The method steps of claim 12 further comprising accessing a patient at a proximal end.

16. The method steps of claim 12 further comprising applying an additive to the cover.

* * * * *